US006836783B1

(12) United States Patent
Lyke et al.

(10) Patent No.: US 6,836,783 B1
(45) Date of Patent: Dec. 28, 2004

(54) FINITE-DIFFERENCE SOLVER BASED ON FIELD PROGRAMMABLE INTERCONNECT DEVICES

(75) Inventors: James C. Lyke, Albuquerque, NM (US); David Vreeland, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 430 days.

(21) Appl. No.: 09/683,136

(22) Filed: Nov. 26, 2001

(51) Int. Cl.[7] .............................. G06J 1/00; G06F 7/38

(52) U.S. Cl. .............................................. 708/3; 708/443

(58) Field of Search ............................ 708/3, 443, 444, 708/802, 804

(56) References Cited

U.S. PATENT DOCUMENTS 6,141,676 A * 10/2000 Ramirez-Angulo et al. . 708/804
2004/0024576 A1 * 2/2004 Meuris et al. ................. 703/6

* cited by examiner

*Primary Examiner*—Tan V. Mai
(74) *Attorney, Agent, or Firm*—James M. Skorich; Kenneth E. Callahan

(57) ABSTRACT

A method for solving a wide variety of linear partial differential equations by exploiting the normally undesirable parasitic resistances present in flexible digital switching components. The terminal relationships of these field programmable interconnect devices can be manipulated under program control to directly mimic the nodal relationships defined in finite difference method models of a partial difference equation problem. Adding analog-to-digital/digital-to-analog converters ("ADCs/DACs") to automate the solution process can extend the method of analog equation solving. It is also possible to segment larger problems using this approach, feeding sections into the device and injecting/capturing voltages as appropriate to produce an overall solution that will eventually converge after a number of presentation/solution sub-cycles.

12 Claims, 13 Drawing Sheets

| Pin | Close switches within FPID as required to connect to pin |
|---|---|
| 1 | 2,5,17 |
| 2 | 6,3,17 (connection to pin 1 is already achieved) |
| 3 | 4,7,17 |
| 4 | 8,17 |
| 5 | 6.9,17 |
| 6 | 7,10 |
| 7 | 8,11 |
| 8 | 12,17 |
| 9 | 10,13,17 |
| 10 | 11,14 |
| 11 | 12,15 |
| 12 | 16,17 |
| 13 | 14,17 |
| 14 | 15,17 |
| 15 | 16,17 |
| 16 | 17 |

| Pin # | Voltage |
|---|---|
| 1 | 0 |
| 2 | 0.187919 |
| 3 | 0.395973 |
| 4 | 0.395973 |
| 5 | 0.187919 |
| 6 | 0.355705 |
| 7 | 1 |
| 8 | 0.355705 |
| 9 | 0.234899 |
| 10 | 0.47651 |
| 11 | 0.47651 |
| 12 | 0.234899 |
| 13 | 0.107383 |
| 14 | 0.194631 |
| 15 | 0.194631 |
| 16 | 0.107383 |

13b

13a

FINITE-DIFFERENCE SOLVER BASED ON FIELD PROGRAMMABLE INTERCONNECT DEVICES

FEDERAL RESEARCH STATEMENT

The conditions under which this invention was made are such as to entitle the Government of the United States under paragraph 1(*a*) of Executive Order 10096, as represented by the Secretary of the Air Force, to the entire right, title and interest therein, including foreign rights.

BACKGROUND OF INVENTION

The present invention is in the field of analog computation circuits, and in particular relates to the use of the parasitic resistance of field programmable interconnect devices to solve finite difference method problems.

The field programmable interconnect device (FPID) is a special-purpose integrated circuit, consisting of a large number of transistor-based electronic switches. The FPID is generically shown in FIG. 1. Its design normally involves a number of externally available input/output (I/O) terminal contacts, a set of wiring pathways, switches between the pathways (represented as circles at a number of the crossing points), and a control circuit that determines which switches are closed based a prescribed pattern, specified from a configuration port. The FPID permits the flexible and agile interconnection between a number of the device's input/output terminals, so that normally isolated parts of a networks can be shorted together, or conversely, so that in designs, some of the connected parts of a network can be isolated by opening switches.

In the simplified FIG. 1 representation, each terminal is connected to a row and column in the wiring array, so that "A" is actually connected to row A and column A, etc. For n terminals, this results in 2 n wires (n rows and n columns). Though this arrangement results in $n^2$ junctions of rows and columns, only $(n^2/2-n)$ switches are required to fully connect the n terminals in any combination. This configuration is sometimes referred to as a fully connected crossbar.

In the unachievable ideal case, the switches represent zero-ohm, zero-length wires when closed and infinite resistance connections when opened. Since most FPIDs are based on silicon MOSFET devices, however, the switches do not achieve the ideal behavior. FIG. 2 illustrates the various representations of the switch in an FPID. FIG. 2*a* is the simplified symbolic representation. FIG. 2*b* is the familiar standard symbolic representation. FIGS. 2*c* and 2*d* represent the n-channel MOSFET and CMOS (n-channel plus p-channel) transmission gate structures respectively, which closely represent the actual switch structures in FPID devices. FIG. 3 provides a more physically accurate representation of an n-channel MOSFET. FIG. 3*b* illustrates the formation of an inversion channel between the drain and source, resulting in a conductive path, the situation more closely representing the closure of an FPID switch. The switch actually behaves more like the resistor shown in FIG. 3*c*, a fact very important to the principle behind the present invention.

Since the switch is a poor switch, the FPID is considered a digital device, for use in switched logic systems. Switch logic systems compensate for the slight signal degradations of transmission gates due to the restorative nature of digital logic systems such as CMOS. For general purpose analog, however, the non-zero resistance of the transmission gate switch (values may range from 50 ohms to 500 ohms, based on the underlying switch design and process technology) results in unwanted signal deterioration and design complexity. Hence, even though it is possible to use FPIDs for analog applications, it is uncommon to use them for these applications due to the normally undesired parasitic resistance.

It is conceivable, however, that the parasitic resistance could be harnessed in particular circuit designs. One such possibility includes the utilization of FPIDs to form certain types of resistive networks, in which the normally parasitic resistance now plays a key role in the operation of that network. One such circuit class is a linear equation solver, for example, based on the finite difference method.

The finite difference method uses a discrete approximation of differential equations to reduce them to a system of algebraic equations. For example, the following is a derivation of the finite difference representations of Laplace's equation in one-dimension Define Laplace's equation:

$$\nabla^2 V=0 \tag{1}$$

In one-dimension, Equation (1) becomes:

$$\frac{d^2 V}{dx^2}=0 \tag{2}$$

The finite forward difference is an approximation of the definition of a derivative:

$$\frac{dV(x)}{dx} \cong \frac{V(x+\Delta)-V(x)}{(x+\Delta)-x} = \frac{V(x+\Delta)-V(x)}{\Delta} \tag{3}$$

Also, define:

$$\frac{dV(x-\Delta)}{dx} \cong \frac{V(x)-V(x-\Delta)}{\Delta} \tag{4}$$

Finite difference representation of higher-level derivatives can be analogously defined:

$$\frac{d^2 V(x)}{dx^2} \cong \frac{\frac{dV(x+\Delta)}{dx} - \frac{dV(x)}{dx}}{x} \tag{5}$$

As $\Delta \to 0$, the approximation improves, being identical to the "true" derivative in the limit as $\Delta \to 0$. Hence, $$x \approx (x+\Delta);\; V(x) \approx V(x+\Delta);$$

$$\frac{dV(x)}{dx} \approx \frac{dV(x+\Delta)}{dx};\; \frac{d^2 V(x)}{dx^2} \approx \frac{d^2 V(x+\Delta)}{dx^2};$$

etc. So, for convenience we develop the finite difference representation of $$\frac{d^2 V(x-\Delta)}{dx^2}$$

and recognize it as an approximation of $$\frac{d^2 V(x)}{dx^2}$$

using (3) and (4):

$$\frac{d^2 V(x-\Delta)}{dx^2} = \frac{\frac{dV(x)}{dx} - \frac{dV(x-\Delta)}{dx}}{x} = \frac{\frac{V(x+\Delta)-V(x)}{\Delta} - \frac{V(x)-V(x-\Delta)}{\Delta}}{\Delta} = \frac{V(x+\Delta)+V(x-\Delta)-2V(x)}{\Delta^2} \cong \frac{d^2 V(x-\Delta)}{dx^2} \cong \frac{d^2 V(x)}{dx^2} \tag{6}$$

and therefore we can write a finite difference approximation to (1) (using (6)) as:

$$\nabla^2 V \cong \frac{V(x+\Delta)+V(x-\Delta)-2V(x)}{\Delta^2} = 0 \Rightarrow V(x+\Delta)+V(x-\Delta)-2V(x) = 0 \Rightarrow V(x+\Delta)+V(x-\Delta) = 2V(x)$$

$$V(x) = \frac{1}{2}(V(x+\Delta) - V(x-\Delta)) \tag{7}$$

Equation (7) is then the finite difference representation of Laplace's equation in one-dimension.

To simplify implementation in a discrete system or a computer, the A's are typically replaced by integral indices, yielding the familiar form of a finite difference equation:

$$V(x) = \frac{1}{2}(V(x+i) - V(x-i)) \tag{8}$$

Extending this analysis to multiple dimensions is straightforward. For two dimensions, Equation (1) becomes:

$$\nabla^2 V(x, y) = \frac{\partial^2 V(x, y)}{\partial x^2} + \frac{\partial^2 V(x, y)}{\partial y^2} \tag{9}$$

Through the previous analyses, we can directly write the approximation of Equation (9) as:

$$\nabla^2 V(x, y) \cong \frac{\left(\frac{V(x+\Delta, y)-V(x, y)}{\Delta} - \frac{V(x, y)-V(x-\Delta, y)}{\Delta}\right) + \left(\frac{V(x, y+\Delta)-V(x, y)}{\Delta} - \frac{V(x, y)-V(x, y-\Delta)}{\Delta}\right)}{\Delta} = \frac{V(x+\Delta, y)+V(x-\Delta, y)+V(x, y+\Delta)+V(x, y-\Delta)-4V(x, y)}{\Delta^2} = 0$$

This results in the two-dimensional finite difference method expression:

$$V(x, y) = \frac{1}{4}(V(x+\Delta, y)+V(x-\Delta, y)+V(x, y+\Delta)+V(x, y-\Delta)) \tag{10}$$

Which can be written in the indexed form as:

$$V(x, y) = \frac{1}{4}(V(x+1, y)+V(x-1, y)+V(x, y+1)+V(x, y-1)) \tag{11}$$

In particular, it will be shown that it is possible to reduce the solution of Poisson's equation:

$$\nabla^2 V = \rho$$

over a two-dimensional (2-D) space to an equation at each of many discrete points on a grid formed onto this space:

$$V(x,y)=1/4*(V(x+dx,y)+V(x-dx,y)+V(x,y+dy)+V(x,ydy))$$

An electrical analog of this discretization can then be realized by using a grid network of resistors. Boundary conditions are simulated by impressing voltages on particular nodes. These sources correspond to Dirichlet boundary conditions. Of course, Poisson's equation reduces to Laplace's equation in source free regions:

$$\nabla^2 V = 0$$

SUMMARY OF INVENTION

In a preferred embodiment, the invention exploits the parasitic resistances of field programmable interconnect devices in the form of a programmable resistive grid to solve a wide variety of linear partial differential equations. The grid can be programmed to mimic the nodal relationships defined in finite difference method models with voltages impressed on externally accessible pins corresponding to Dirichlet boundary conditions and a means to read out the solutions (voltages) at the grid nodal points. A resistive grid may contain up to hundreds of terminals. Problems requiring even greater nodal points can be solved sequentially using a plurality of resistive grids with the outputs of the first resistive grid component forming the input, boundary conditions of the next resistive grid component. Such an approach has a distinct advantage over custom solvers that are normally higher in performance but fixed in their connection topology.

Other aspects and advantages of the present invention will become apparent from the following detailed description, taken in conjunction with the accompanying drawing, illustrating by way of example the principles of the invention.

BRIEF DESCRIPTION OF DRAWINGS

FIG. 3*a* illustrates an n-channel MOSFET; 3*b* shows the formation of an inversion channel between the drain (D) and source (S), and 3*c* illustrates the parasitic resistance of the structure.

FIG. 7*a* is an electrical analog using a grid network of resistors to represent the solution of Poisson's equation over a 2-D space reduced to discrete points on a grid.

FIG. 7*b* depicts a smaller sub-region of FIG. 7*a*.

FIG. 7*c* illustrates notionally how switches might be set in a FPID switch array to produce the FIG. 7*b* sub-region.

DETAILED DESCRIPTION

The purpose of the current invention is to exploit the undesired parasitic resistance in a special class of digital integrated circuits to perform analog computation. This class of integrated circuits, referred to as field programmable interconnect devices (FPID's) act as crossbar switches, permitting the arbitrary connection of many signals attached to the package pins of the components. The invention extends the application of this crossbar to computation, which can now be used as a building block in analog or hybrid (analog plus digital) computer architectures.

The present invention exploits the parasitic resistance of FPIDs to form a programmable resistive grid that can be used to solve certain finite difference method (FDM) problems. A FPID component contains dozens to hundreds of terminals that can be shorted together or isolated under program control. 'Shorting' and "isolating" are relative concepts. Since contemporary FPID components are built using MOSFET transistors in silicon integrated circuits configured as switches, their connective paths, formed by path closures, have intrinsic channel resistance. So, instead of "shorting" terminals together, the path closure forms a resistance. This resistance is generally undesirable, but as it is nominally consistent from switch to switch, it is possible to exploit this regularity to form resistive grids. The grids take on configurations as defined by programming the connection paths between any given combination of terminals. Similarly, when the path is opened, an extremely large but finite resistance remains in effect between terminals. Fortunately, for the purposes of the current invention, it is possible to neglect this effect, i.e., to treat the open condition as the ideal case of infinite resistance or isolation.

Figure 1:
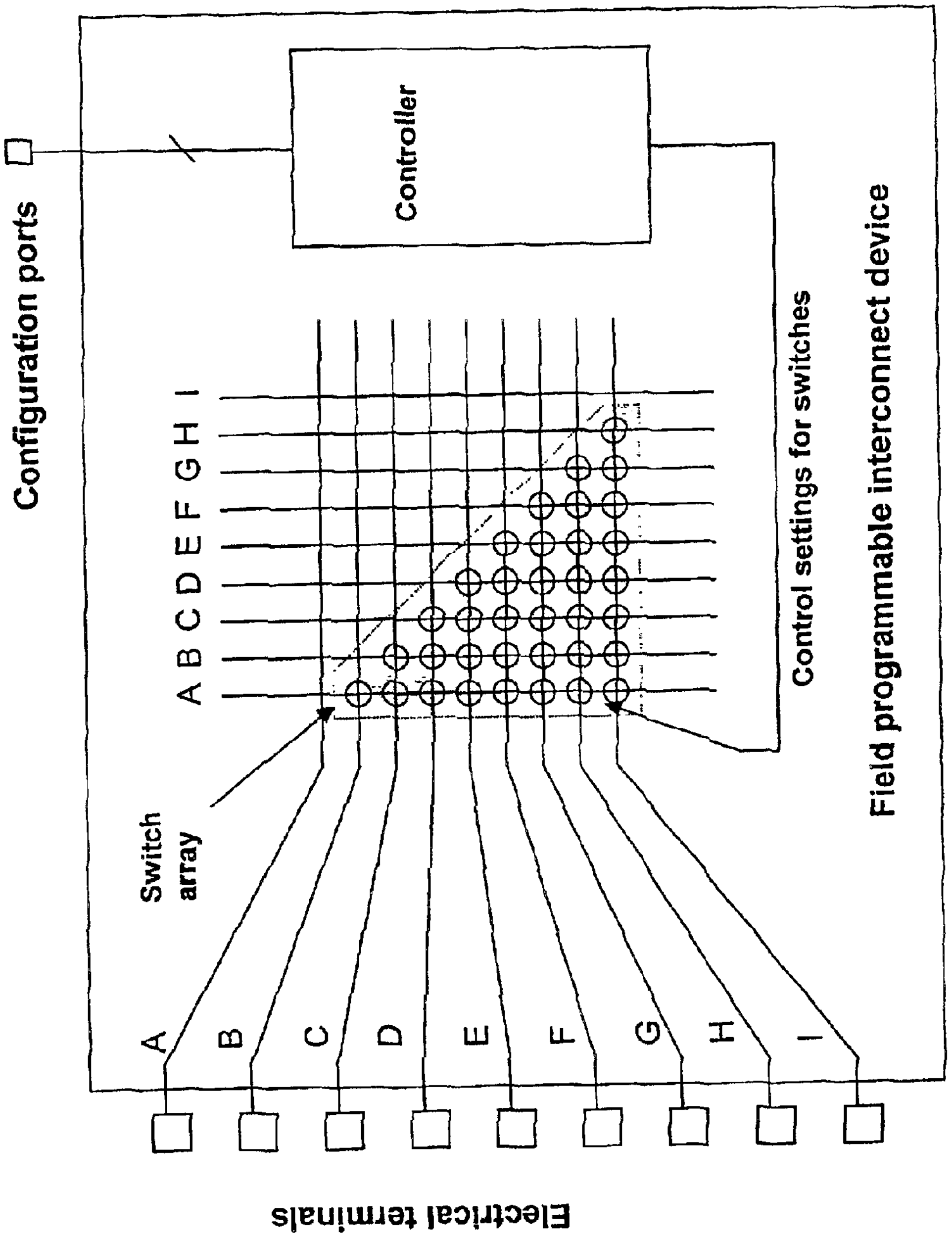
FIG. 1 (Prior Art)
FIG. 1 illustrates a generic field programmable interconnect device (FPID).
Figures 2, 2A, 2B, 2C, 2D:
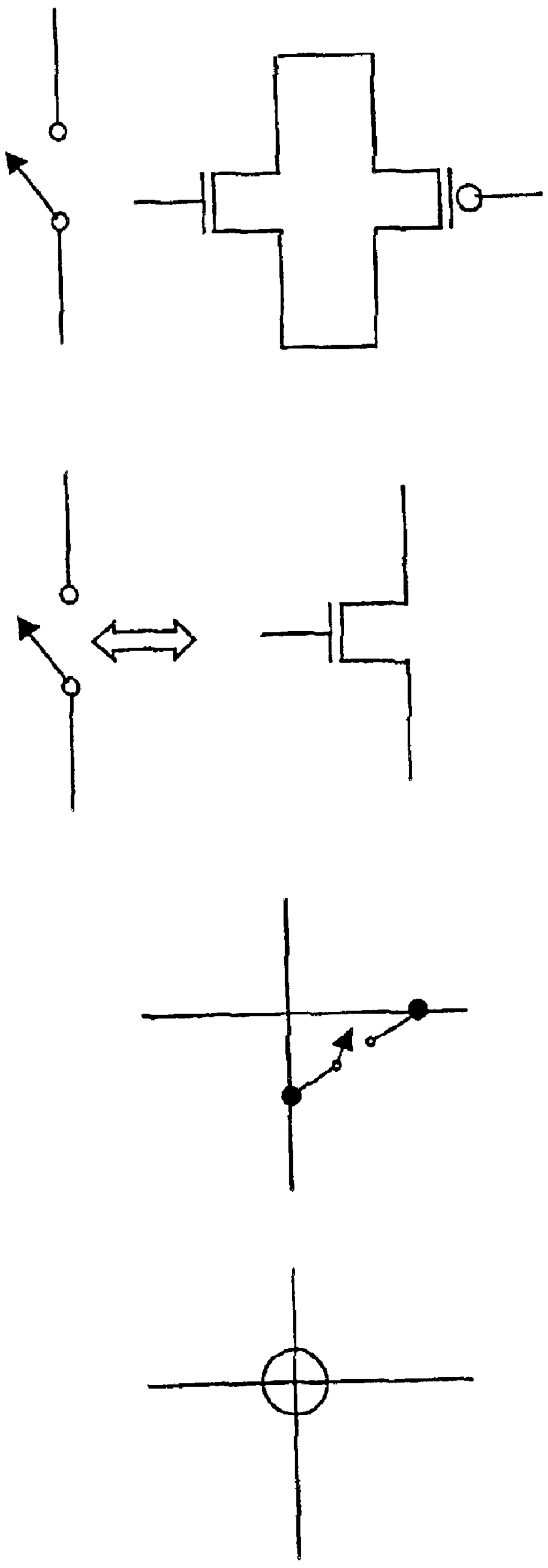
FIG. 2 (Prior Art)
FIG. 2 illustrates various representations of a switch in a FPID, with 2*a* being a simplified symbolic representation, 2*b* is the standard symbolic representation, 2*c* represents the n-channel MOSFET transmission gate structure, and 2*d* is the n-channel plus p-channel CMOS transmission gate structure.
Figure 3:
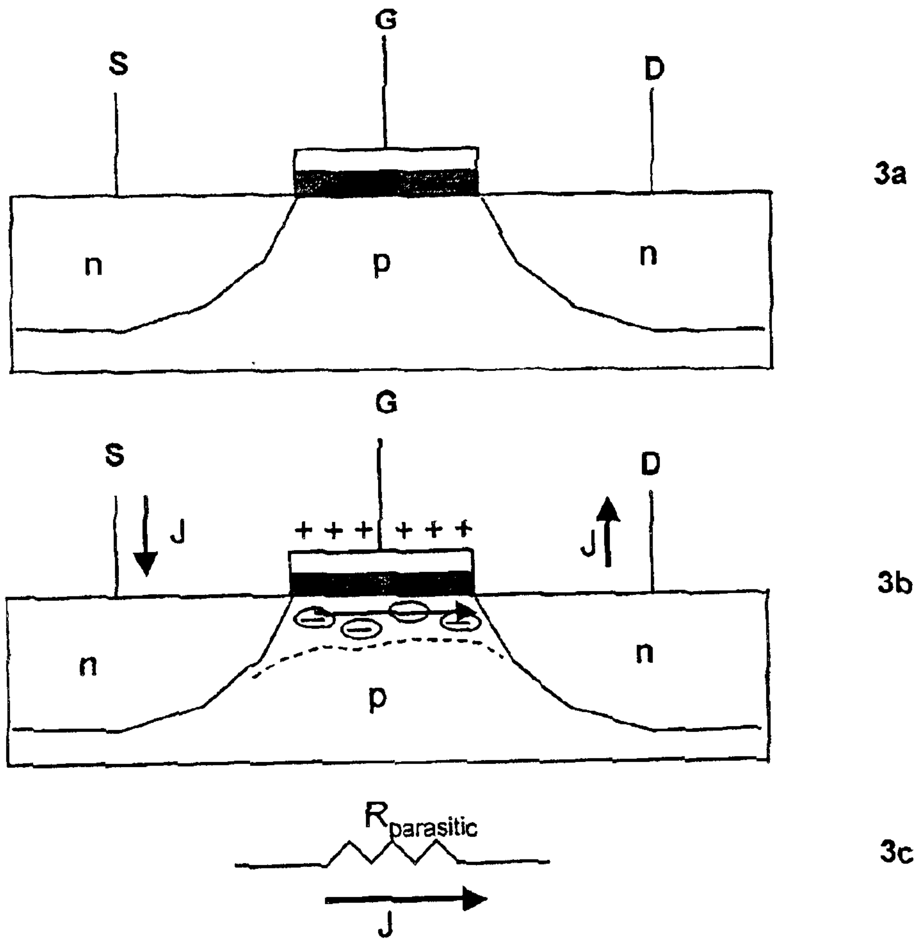
FIG. 3 (Prior Art)
FIG. 3 illustrates the transformation of an n-channel MOSFET using an inversion channel.
Figure 4:
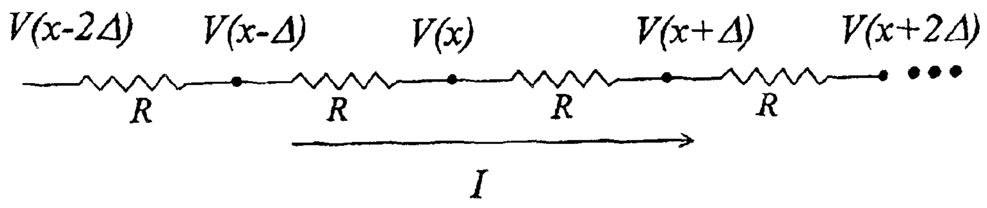
FIG. 4 is a linear array of connected resistors that is shown to approximate the finite difference representation of Laplace's equation in one dimension.

Equation 7 was previously shown to be the finite difference representation of Laplace's equation in one dimension. It will now be shown that a linear array of connected resistors implements the approximation of Laplace's equation given in Eq. 7. The network of resistors is defined in FIG. 4. Next, we write equations for V(x) and V (x+Δ) based on elementary circuit theory:

$$V(x)=V(x-\Delta)+IR$$

$$V(x+\Delta)=V(x)+IR$$

Combining these equations yields Equation (7):

$$V(x+\Delta)=V(x)+(V(x)-V(x-\Delta))\Rightarrow V(x)=\frac{1}{2}(V(x+\Delta)+V(x-\Delta))$$

The Δ's are typically replaced by integral indices, yielding the familiar form of a finite difference equation:

$$V(x)=\frac{1}{2}(V(x+1)-V(x-1)) \tag{8}$$

Figure 5A:
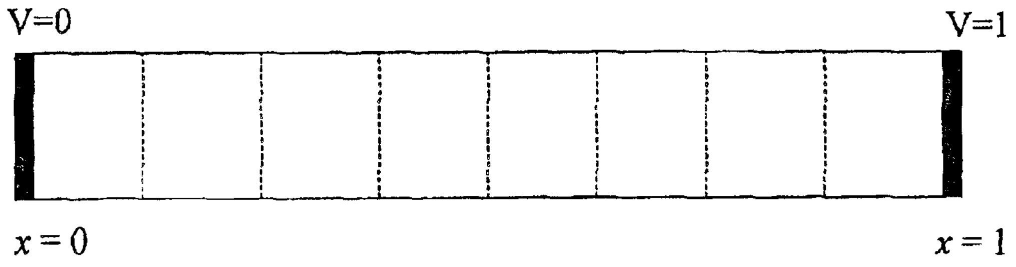
FIG. 5*a* is a cross-sectional representation of a capacitor.

Consider a very simple 1-D exemplary problem, i.e., solving the electrostatic potential in an infinite slab. In this case, two conducting slabs are provided to contain a dielectric slab, one positioned at x=0 and one at x=1. Though shown as finite, the slabs are understood to have infinite extent in the y and z axes (an ideal parallel plate capacitor). Boundary conditions are provided in the form of specified voltages at each conducting slab, namely V(0)=0 and V(1)=1. This is shown in FIG. 5*a*. The corresponding differential equation problem is simply:

$$\frac{d^2V}{dx^2}=0$$

with V(0) and V(1)=1.

An analytic solution is quickly developed by integrating this equation, producing $$\int(0)dx=k_1$$

and once again integrating to produce $$V(x)=\int k_1dx=k_1x+k_2$$

It is obvious that V(0)=0 implies that $k_{2=0}$, and V(1)=1 implies that $k_{1=1}$, producing the very simple result that $$V(x)=x.$$

V(x) x becomes a reference verification for a finite difference model representation of the initial problem. Based on the previous discussion, it is straightforward to model the slab as a resistive network.

Figure 5B:
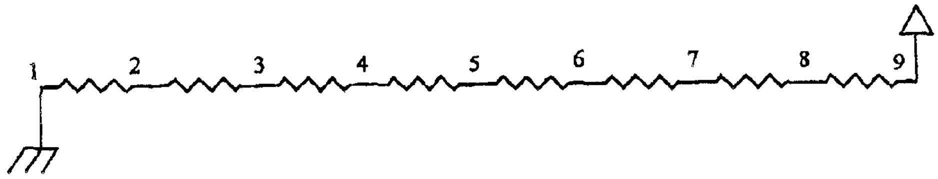
FIG. 5*b* is a model of the FIG. 5*a* capacitor as a resistive network.

In this case, the resistances represent discretizatlon of the slab at nine equidistant points as shown in FIG. 5*b*. The voltage applied to point 1 equals zero volts, whereas the voltage applied to point nine equals one volt. Whether a discrete finite difference model is used in which $$V_i^{n+1} = \frac{1}{2}(V_{i-1}^n + V_{i+1}^n)$$

or the resistor network is built and measured or analyzed, clearly the resulting findings will be as follows from points 1 to 9:0, 0.125, 0.250, 0.375, 0.500, 0.625, 0.750, 0.875, 1,000. This corresponds exactly to the analytic solution previously specified by V(x)=x.

Figure 6A:
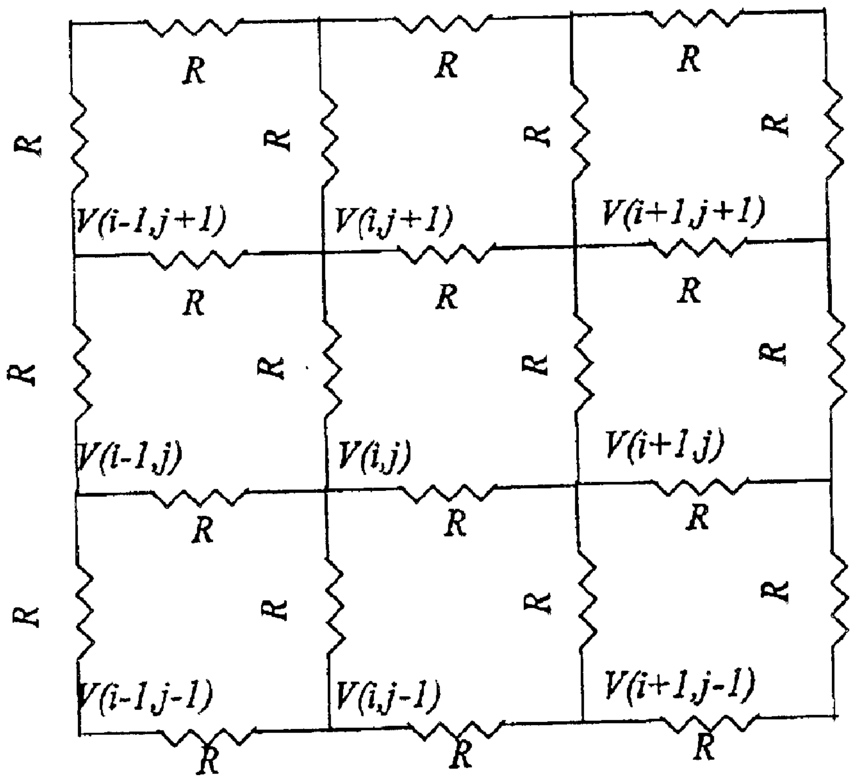
FIG. 6*a* is a two-dimensional mesh resistor that approximates the finite difference representation of Laplace's equation in two dimensions.

For the two-dimensional (2-D) case, a 2-D mesh resistor (FIG. 6*a*) implements the finite difference representation for Laplace's equation in 2-D, previously derived in index form as:

$$V(x, y) = \frac{1}{4}(V(x+1, y) + V(x-1, y) + V(x, y+1) + V(x, y-1)) \tag{11}$$

Figure 6B:
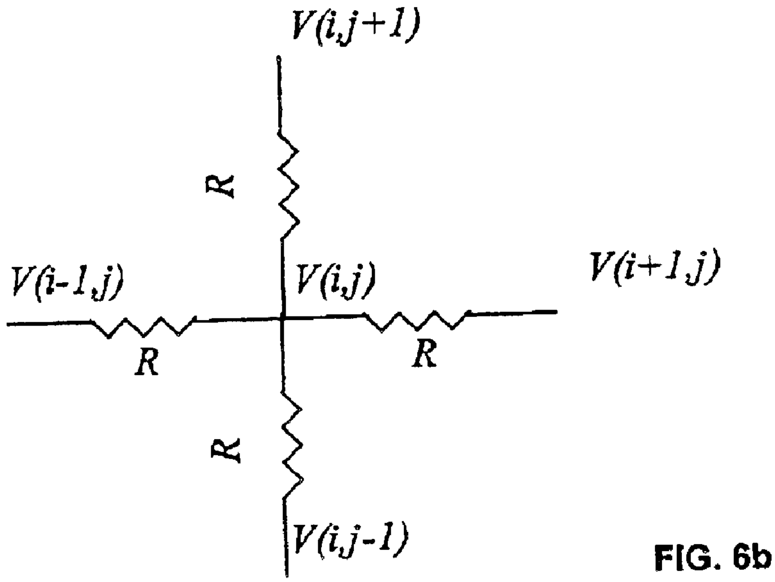
FIG. 6*b* is a north-east-west-south (NEWS) resistor grid pattern of nearest neighbors.

As such, a FDM grid can be imposed by establishing a north-east-west-south (NEWS) pattern of nearest neighbors starting with a chosen terminal (see FIG. 6*b*) until all the terminals are consumed by the network formed. This resistive network models a Laplacian 2-D partial differential equation. More elaborate, multi-dimensional (when viewed from a Euclidean perspective) grids can easily be established by simply defining the appropriate connective paths.

Figure 7:
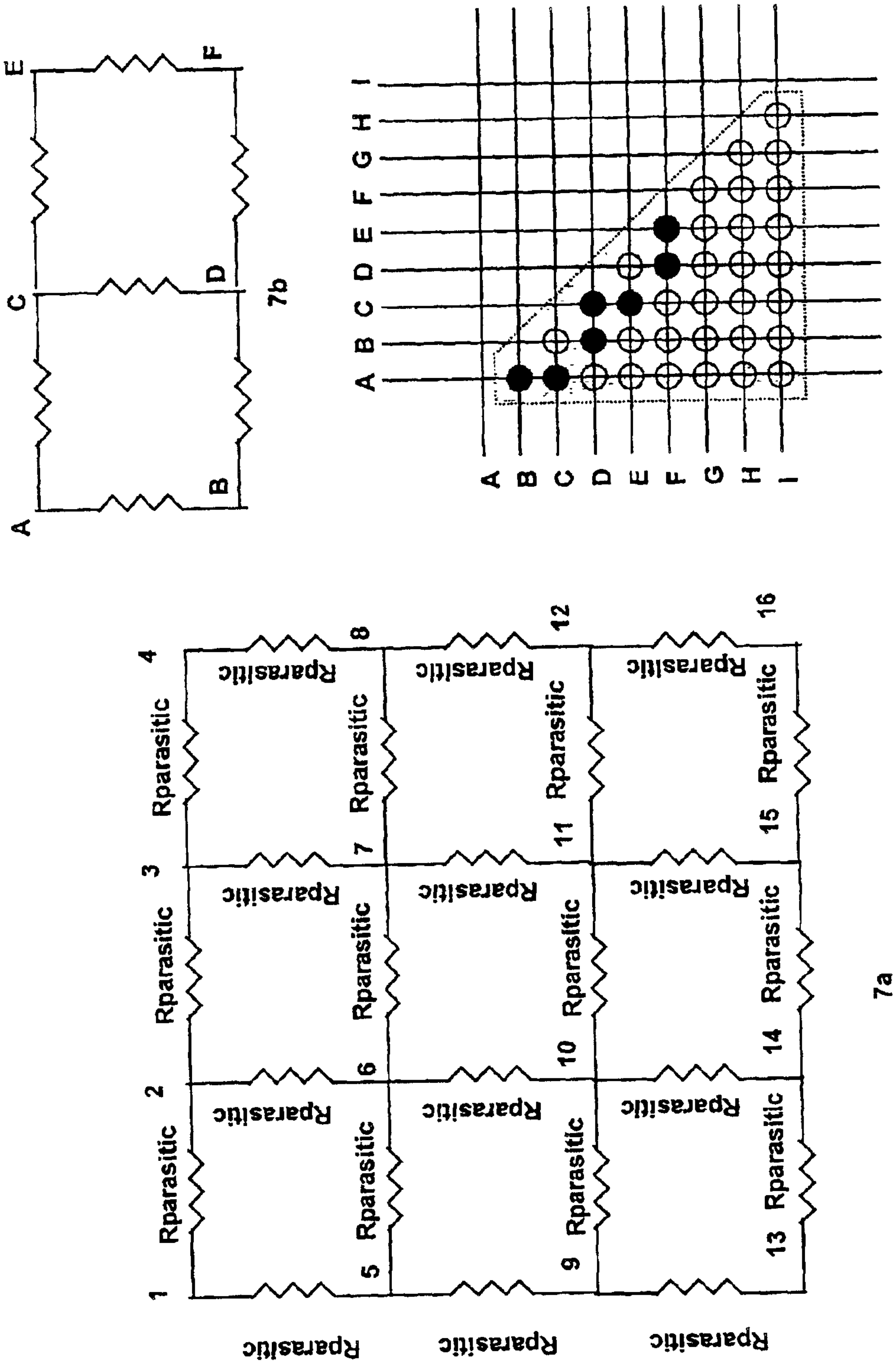
FIG. 7 illustrates networks of switches configured to present parasitic resistances.

The present invention then deliberately exploits the parasitic resistance of FPID's to form a partial differential equation solver. This involves configuring the FPID to create networks similar to that shown in FIG. 7 by closing the appropriate set of switches. By closing FPID switches in this manner, a network of parasitic resistances results. While the parasitic resistance values may vary from one design to another, or even from one lot run to another, the parasitic resistance values across a particular device typically are very closely matched due to process controls used to maximize device yield. Therefore, the FPID can be used as an effective analog-domain equation solver, which can converge much faster than a corresponding digital implementation of the finite difference method.

FIG. 7*a* Illustrates the resistive grid topology typical of 2-D discretized implementations of a finite difference method equation that can be implemented using the parasitic resistances of switches in a FPID. FIG. 7*b* depicts a smaller sub-region, and FIG. 7*c* illustrates notionally how switches might be set in a FPID switch array to produce the FIG. 7*b* sub-region.

Figures 8A, 8B:
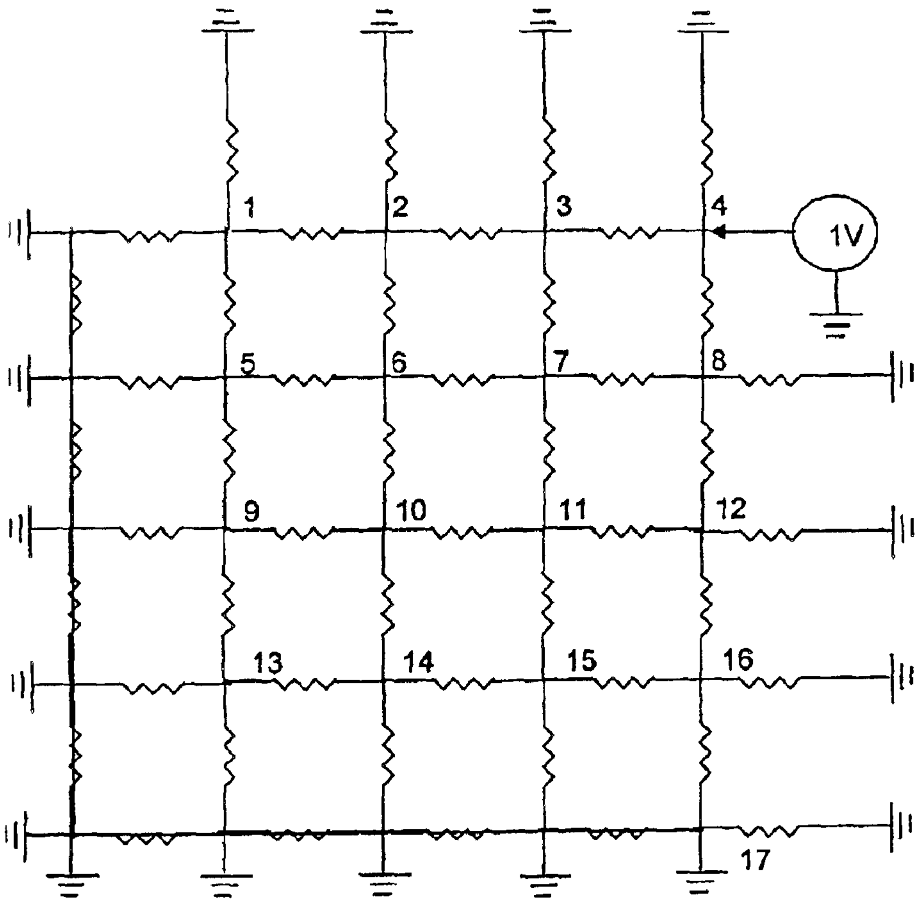
FIG. 8*a* Illustrates a small sample network in which a number of nodes are forced with a V=0 Dirichlet boundary condition and a single node is forced with a V=1 Dirichiet boundary condition.
FIG. 8*b* is a table summarizing the required switch closures for the FPID network shown in FIG. 8*a*.

The implementation of the FPID equation solver is illustrated simply with a small example. FIG. 8*a* shows a network in which a number of nodes are forced with a V=0 Dirichlet boundary condition and a single node is forced with a V=1 Dirichlet boundary condition. Two exterior pins are required, a ground pin connected to terminal number 17 for the V=0 boundary condition and a connection of a one volt source to terminal number 4 for the V=1 boundary condition. No other external connections are required to the FPID, except for the connections required to power the device control circuitry and the configuration port. The pin connections between nodes are then prescribed in an obvious way. For example, pin number 6 is connected to pins number 2, 5, 7, and 10. Any ground connection is achieved by connecting to pin number 17. The table (FIG. 8*b*) summarizes the required switch closures.

Once these switch closures have been accomplished, the FIG. 8 network is formed and the solution of Laplace's/Poisson's equation is available very quickly (much less than one microsecond) and can be directly evaluated at any terminal through measurement of the voltage at particular pins. Changing the boundary conditions can be done continuously and independently, without changing the switch configuration. It is also possible to completely alter the network connections, representing a different equation and boundary conditions.

Figures 9A, 9B:
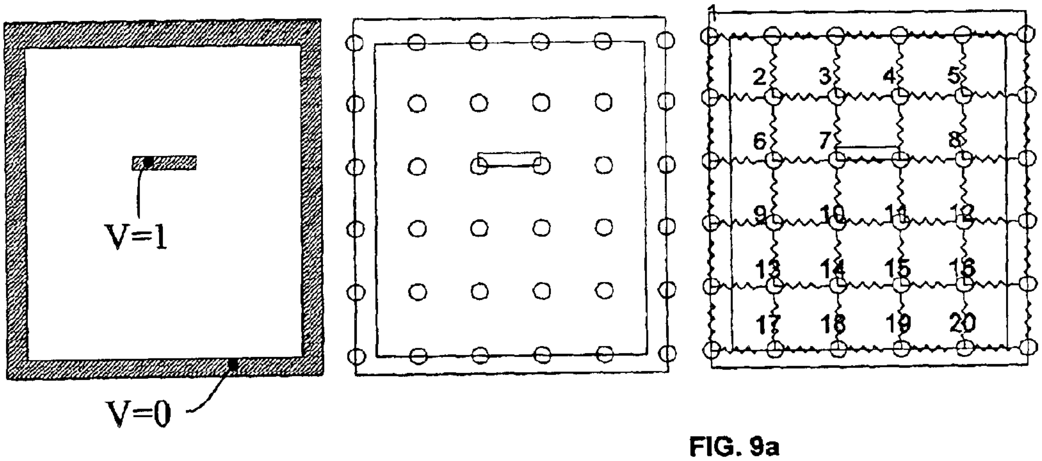
FIG. 9*a* represents a 2-D confined charge box sample problem with the box shown in cross-section.
FIG. 9*b* is a table of the pin connections and expected measurements for the 9*a* problem solved by using a FPID device.

While the 1-D capacitor case above demonstrates a nearly trivial example, it is equally straightforward to extend the same technique to much more analytically difficult examples. FIG. 9*a* shows a relatively simple two-dimensional confined charge box. A cross-sectional view of an infinitely long box is shown. An analytic solution of V(x,y) within the box is not easily developed. However, a discretized version can be solved by conventional techniques using a matrix of linear equations or a discrete finite difference numerical method. The problem can also be much more rapidly solved directly using a FPID device. The pin connection and expected measurements are provided in the FIG. 9*b* table.

In this case, the pin number corresponds not necessarily to the identically numbered pin on the FPID device, but rather to a specific sequence on sixteen user pins. The voltages on pin #1 and pin #7 (FIG. 9*a*) are fixed as boundary conditions, and the voltages on other pins are measured after the FPID is suitably programmed to model the neighborhood relationships implied in the shown discretization.

It is important to indicate that there are practical limits to the use of the FPID as an analog-domain equation solver. First, the excursion range or operational window of an FPID is limited. Therefore the range of voltages impressed upon the FPID must not exceed in a positive or negative polarity the magnitude that would cause the transistor switches in an FPID to breakdown the gate voltage or forward bias the substrate connection, for example. A typical industrial FPID device might permit a voltage range from 0V to 1V for example.

Figure 10:
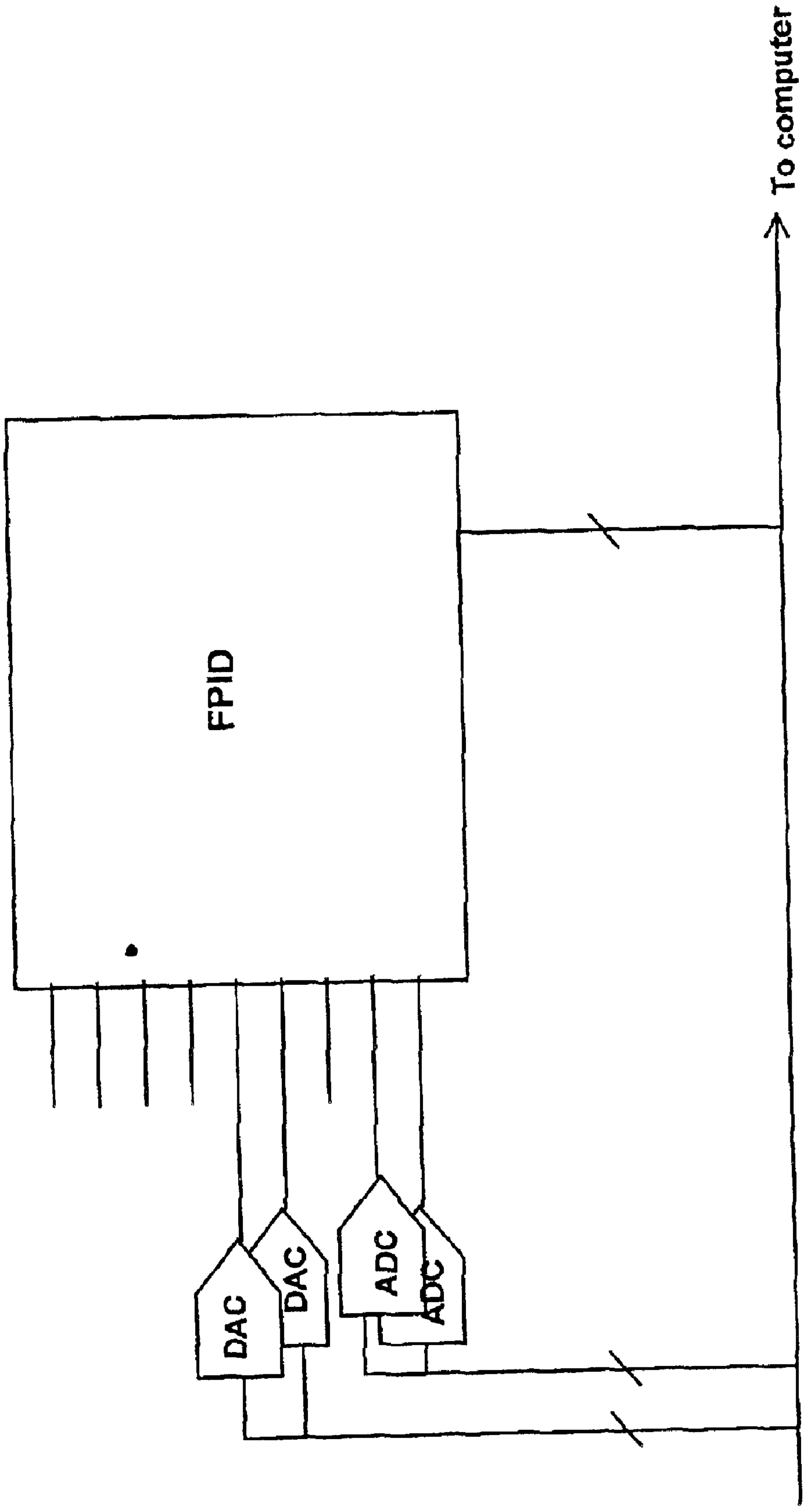
FIG. 10 illustrates a self-contained FPID with a number of digital-to-analog converters and analog-to-digital converters added to the FPID to produce a hybrid computer.
Figure 11:
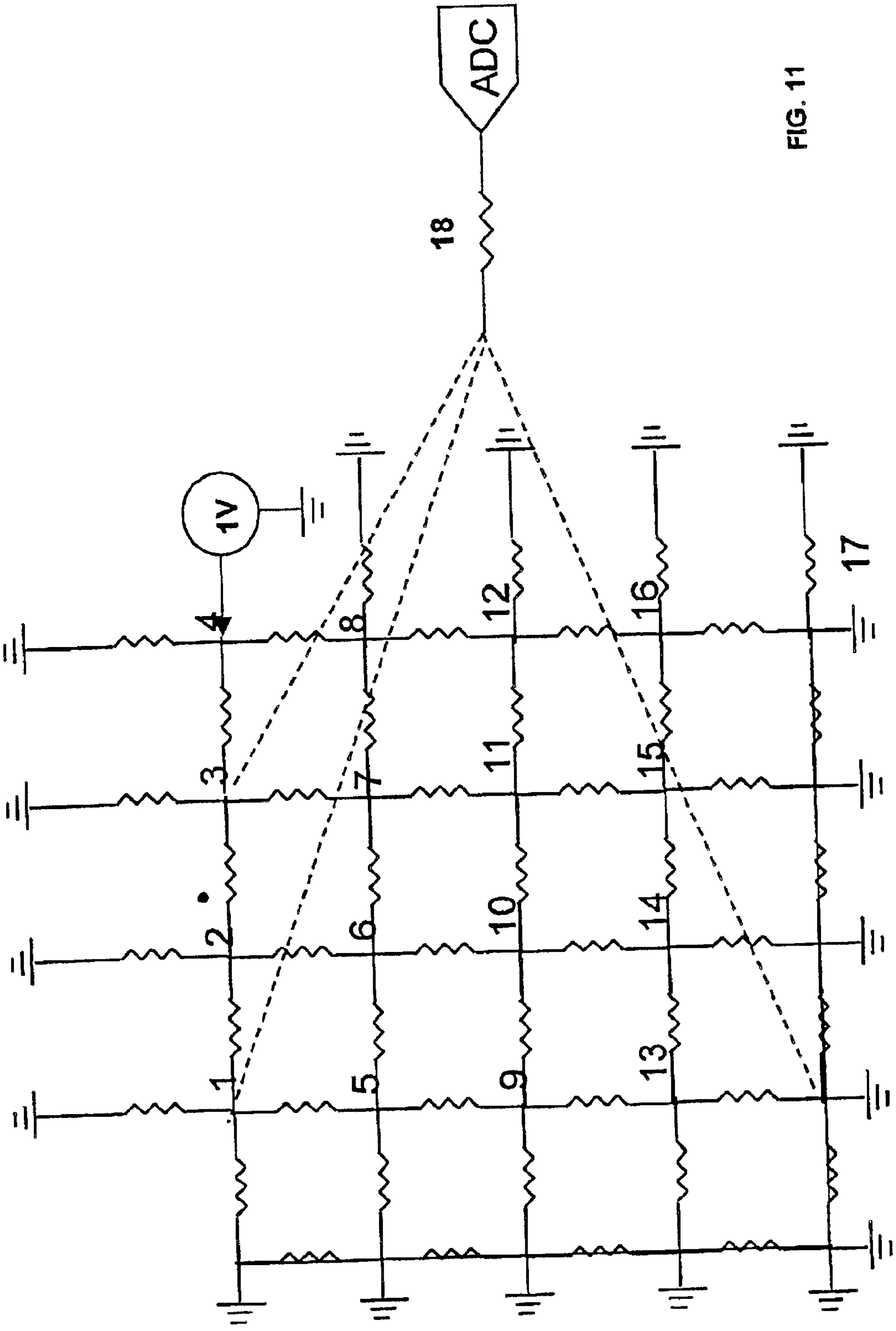
FIG. 11 illustrates temporary connections, made one-at-a-time, to acquire voltage measurements for a FPID.

To simplify and automate the creation and instrumentation of test partial differential equation configurations, it is possible to make a self-contained circuit, such as shown in FIG. 10. Here, a number of digital-to-analog converters (DACs) and analog-to-digital converters (ADCs) are added to the FPID to produce a hybrid computer. A number of obvious design details are omitted, such as: (1) the bussing arrangements and enable signals for the different peripheral blocks, (2) that the operating windows of the ADC/DAC components must be aligned with the effective operating voltage range of the FPID switch, and (3) the DAC outputs must be themselves isolated (using possible a transmission gate switch) when they are not used actively in a particular problem formulation. The primary function of the DACs is to inject boundary conditions, while the function of the ADCs is to read analog voltages corresponding to nodal solutions. Therefore, the number of nodal boundary conditions is limited by the number of DAC circuits. The number of ADCs may be as few as one. If the ADC employs an infinite impedance front end, then it is conceivable that an ADC can be tied to a single pin of the FPID. It is then possible, one by one, to close switches between the measurement node (defined as the single pin connected to an analog-to-digital converter) and particular nodes in an active equation under solution for the purposes of measurement. This configuration is suggested in FIG. 11 where temporary connections are made one at a time to acquire voltage measurements. When the input impedance 78 of the ADC is infinite, then the parasitic resistance formed by the temporarily switched measurement connections will not contribute to measurement error. In the case of finite resistance, a systematic (correctable) error due to the corresponding voltage ladder effects.

It is sufficient, therefore, to obtain all measurements with one ADC per FPID. The addition of more ADCs is only advantageous in the cases where it is necessary to more rapidly acquire signal measurements.

Figure 12:
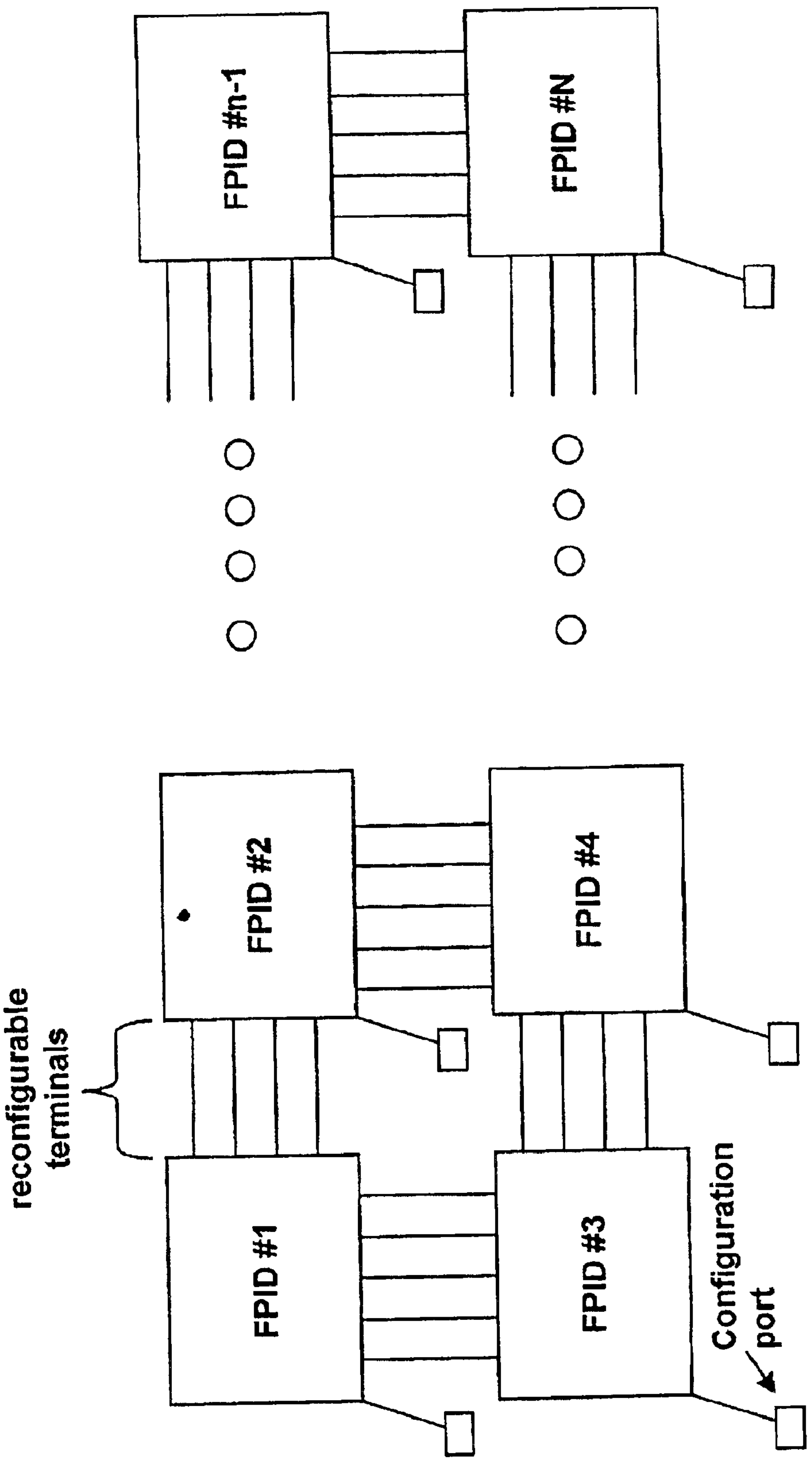
FIG. 12 illustrates a larger-network comprised of a plurality of individual FPID's interconnected with reconfigurable terminal pins.

It is possible to extend these concepts by adding FPIDs. In this case, the external (reconfigurable) terminal pins of FPIDs are interconnected in some way to facilitate the extension of the parasitic networks of the ensemble to a larger effective network. This possibility is suggested in FIG. 12. Two notes are pointed out here. First, the configuration by which the FPIDs are interconnected is shown as a 2-D planar mesh. In fact, an almost arbitrary number of arrangements are possible, including those configurations where pins are shared with more than two FPIDs. Second, the configuration portals of each of the FPiDs are shown as independent. They must be connected to a computer or programming source to supply the commands for switch closures within the FPIDs. It is possible that, rather than distinct and independent, that the configuration ports might be bussed together or daisy-chain connected together, consistent with the practices used in complex systems containing multiple FPGA devices.

Figure 13:
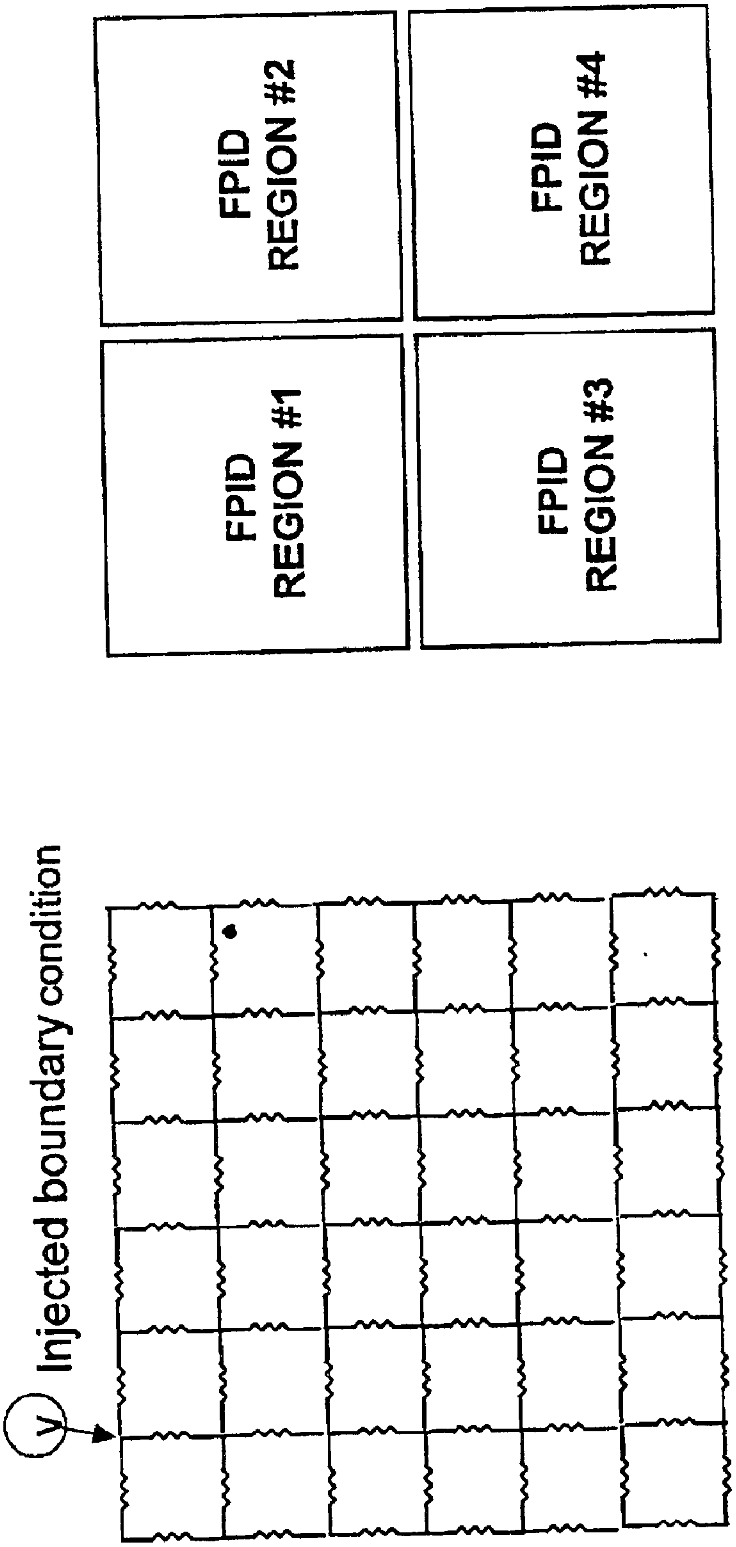
FIG. 13 shows a finite difference mesh (13*a*) that is too large to fit onto one FPID device and (13*b*) shows how this mesh might be sectioned into four segments.
Figure 14:
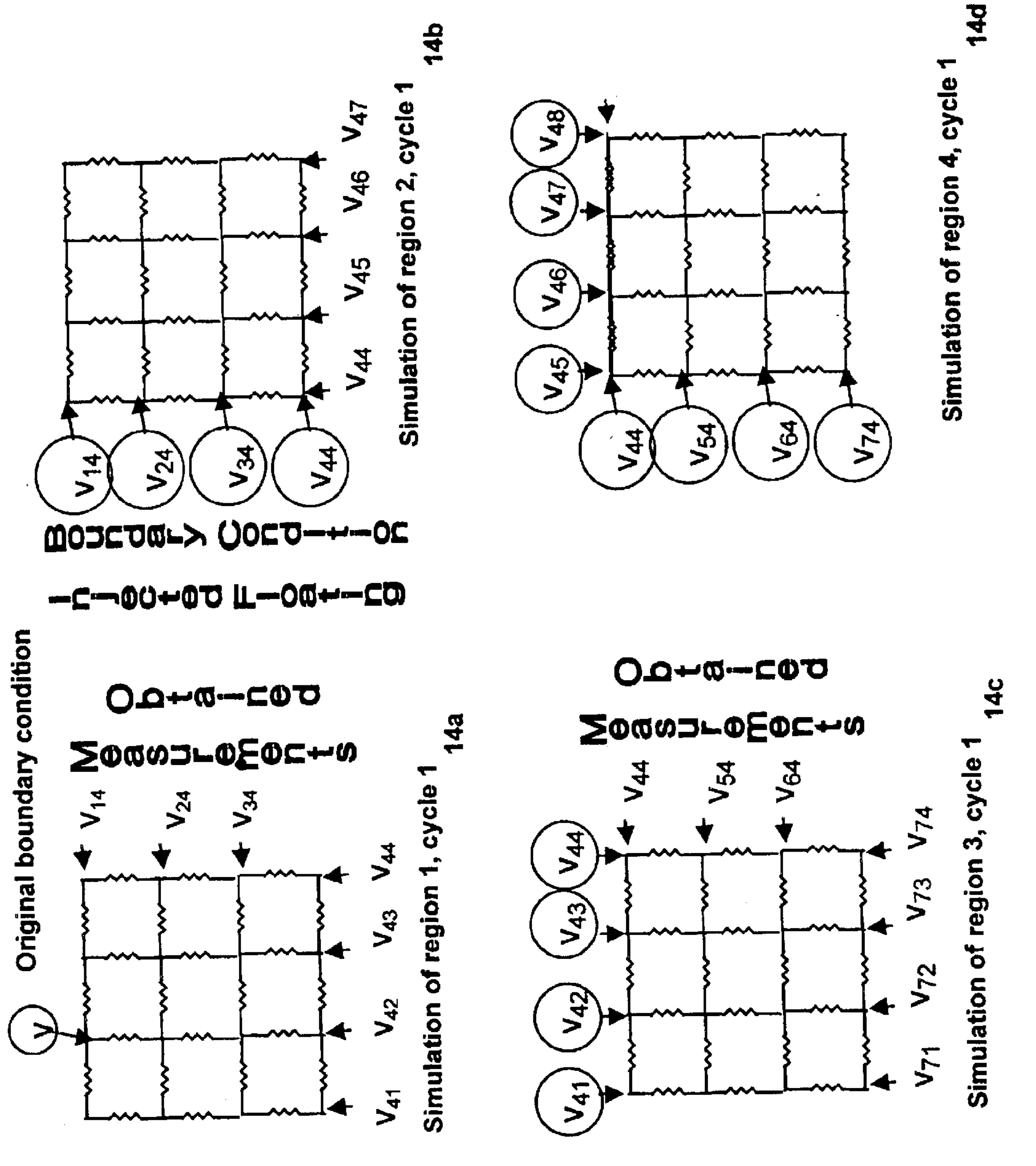
FIG. 14 shows the solution process for the first complete cycle of a four segment finite difference mesh, where 14*a* is the first segment corresponding to FIGS. 13*a*, 14*b* corresponds to 13*b*, etc.

The primary motivation for using multiple FPIDs is to extend the size of the problem that could be solved using the analog-domain approach that is the basis of the invention. It is also possible to extend the size of solvable problems by extending the FIG. 7 configuration, using a DAC to optionally drive every terminal pin of an FPID. To illustrate how such an approach can be used to solve an "oversized" problem, a simple example is provided in FIG. 13. In this case, a finite difference mesh (FIG. 13*a*) is too large to fit onto one FPID device. Instead, the problem is sectioned into four pieces or "segments", as suggested in FIG. 13*b*. The first steps of an iterative solution process are shown in FIG. 14. Briefly, the solution process involves driving the boundaries of the current "segment" with values obtained from simulating the adjacent segments in the last cycle. The DACs are used to force these values temporarily during a given cycle. These values will typically change each cycle, and so they are called floating (Dirichlet) boundary conditions. Initial conditions may be chosen empirically or simply set to null (undriven).

In FIG. 14, the first complete cycle of a four-segment simulation is shown. The first segment, corresponding to the upper left quadrant of FIG. 13*b*, is configured or loaded onto the FPID, including any external boundary conditions, which corresponds to FIG. 14*a*. The FPID is operated very briefly and the boundary cell values are measured and stored. The next piece, corresponding to the upper right quadrant of FIG. 13*b*, is loaded onto the FPID as suggested in FIG. 14*b*. In this case, some values from the FIG. 14*a* simulation, which were measured, are now used themselves as boundary conditions to be driven by the appropriate DACs, providing a more approximate boundary condition set for the new simulation. This new simulation in turn produces node values to be measured and used in subsequent simulations. The process is repeated in FIGS. 14*c* and 14*d*, corresponding to the lower left and right quadrants, respectively, of FIG. 13*b*. In subsequent cycles of the computation process illustrated in FIG. 14, the boundary measurements eventually converge to accurate values for the overall simulation.

What is claimed is:

1. An analog computer controlled by an auxiliary digital computer for solving partial differential equations by the finite difference method comprised of:

a plurality of digital programmable switching devices having similar parasitic resistances that are connected to each other in a resistive grid having nodal points, said plurality of digital programmable switching devices also including externally accessible pins;

one or more analog-to-digital converters having inputs selectively connectable to said nodal points, wherein voltage readings from said nodal points are readable through said analog-to-digital converters via said auxiliary digital computer, and wherein said auxiliary digital computer is connected to outputs associated with said one or more analog-to-digital converters; and one or more digital-to-analog converters including outputs that are adapted to inject voltages via connection of said one or more digital-to-analog converters to said externally accessible pins, wherein said voltages are presented to said externally accessible pins via said auxiliary digital computer through its connection to inputs associated with said one or more digital-to-analog converters, and wherein said voltages correspond to Dirichlet boundary conditions.

2. The analog computer of claim 1 wherein said digital programmable devices are field programmable interconnect devices, in which the terminal-to-terminal connection relationship is arbitrarily definable under program control.

3. The analog computer of claim 2, wherein a large partial differential equation problem to be solved is partitioned in sub-problems, where a solution to the large partial differential equation problem is effected by using a combination of known Dirichlet boundary conditions provided from a problem specification and unknown Dirichlet boundary conditions that are supplied through computation by said computer based on measurements from appropriate nodal points based on one or more of the sub-problems, and the solution of the large partial differential equation problem is completed by iteratively solving the sub-problems in rotation, which produces eventual convergence.

4. A system for solving partial differential equations by the finite difference method, said system comprised of:

a network of two or more field programmable interconnect device (FPID) sections, each FPID section comprised of an array of FPID devices having similar parasitic resistances and connected to each other in a resistive grid, thereby forming nodal points;

external terminal pins connected to each FPID section;

digital-to-analog converters adapted to inject voltages at said external terminal pins, wherein said voltages corresponding to Dirichlet boundary conditions and said digital-to-analog converters are controlled by an auxiliary digital computer; and one or more analog-to-digital converters, also under the control of said auxiliary digital computer, are connectable to selected nodal points of any FPID section, whereby nodal point voltages may be road are readable via said auxiliary digital computer.

5. A method of solving problems having a partial differential equation by the finite difference method using a programmable resistive grid including a network of field programmable interconnect devices (FPIDs), said programmable resistive grid having externally accessible pins and grid nodal points, comprised of:

impressing voltages from an analog voltage source onto said externally accessible pins, said voltages corresponding to Dirichlet boundary conditions;

measuring the voltages at grid nodal points; and providing voltage measurements from the grid nodal points to a computer, wherein the computer is programmed to use the voltage measurements to solve the partial differential equation.

6. The method of claim 5 wherein the step of impressing voltages from an analog voltage source onto said externally accessible pins further comprises providing said voltages from a digital-to-analog converter.

7. The method of claim 6 wherein the digital-to-analog converter is under the control of the computer.

8. The method of claim 6 wherein the step of measuring the voltages at said grid nodal points further comprises measuring the voltages at said grid nodal points using an analog-to digital converter.

9. The method of claim 8 wherein the digital-to-analog and analog-to-digital converters are under the control of the computer.

10. The method of claim 5 wherein the step of measuring the voltages at grid nodal points further comprises measuring the voltages at said grid nodal points using a analog-to-digital converter.

11. The method of claim 10 wherein analog-to-digital converter is under the control of the computer.

12. The method of claim 5 wherein:

the step of impressing the voltages from the analog voltage source onto said externally accessible pins further comprises providing the voltages from a digital-to-analog converter;

the step of measuring the voltages at said grid nodal points further comprises measuring the voltages at said grid nodal points using an analog-to digital converter; and the digital-to-analog and analog-to-digital converters are under the control of the computer, which is programmed to carry out the steps of providing and measuring the voltages.

* * * * *